United States Patent
Kim et al.

(10) Patent No.: US 8,403,548 B2
(45) Date of Patent: Mar. 26, 2013

(54) BACKLIGHT ASSEMBLY AND DISPLAY DEVICE HAVING THE SAME

(75) Inventors: Hwan-Jin Kim, Suwon-si (KR); Se-In Chang, Suwon-si (KR); Young-Bee Chu, Yongin-si (KR); Sang-Hee Lee, Suwon-si (KR); Jeong-Seok Oh, Seoul (KR); Jae-Lok Cha, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 341 days.

(21) Appl. No.: 12/416,038

(22) Filed: Mar. 31, 2009

(65) Prior Publication Data

US 2009/0296423 A1    Dec. 3, 2009

(30) Foreign Application Priority Data

Jun. 2, 2008    (KR) .................. 10-2008-0051793

(51) Int. Cl.
*F21V 8/00* (2006.01)
*G02F 1/1335* (2006.01)

(52) U.S. Cl. ........... 362/606; 362/612; 362/621; 349/64

(58) Field of Classification Search .................. 362/611, 362/612, 613, 606, 607, 608, 609, 617, 618, 362/621; 349/61, 62, 64, 65, 67
See application file for complete search history.

(56) References Cited

U.S. PATENT DOCUMENTS

| | | | |
|---|---|---|---|
| 6,942,374 B2 * | 9/2005 | Lee | 362/615 |
| 7,001,035 B2 * | 2/2006 | Kawakami | 362/617 |
| 7,548,287 B2 * | 6/2009 | Oh | 349/65 |
| 7,717,605 B2 * | 5/2010 | Shibata | 362/630 |
| 7,771,100 B2 * | 8/2010 | Yamamoto et al. | 362/606 |
| 7,810,978 B2 * | 10/2010 | Ohno | 362/612 |
| 7,911,553 B2 * | 3/2011 | Tanaka | 349/58 |
| 2007/0165419 A1 * | 7/2007 | Horiuchi et al. | 362/606 |
| 2008/0106913 A1 * | 5/2008 | Ha | 362/618 |
| 2008/0170174 A1 * | 7/2008 | Nishiyama | 349/62 |
| 2009/0002598 A1 * | 1/2009 | Choo et al. | 349/62 |
| 2009/0322983 A1 * | 12/2009 | Hashino | 349/61 |

FOREIGN PATENT DOCUMENTS

| | | |
|---|---|---|
| JP | 2005-251687 | 9/2005 |
| KR | 2003-0049939 | 6/2003 |
| KR | 2007-0065079 | 6/2007 |
| KR | 2007-0100974 | 10/2007 |

* cited by examiner

*Primary Examiner* — Peggy A. Neils
(74) *Attorney, Agent, or Firm* — Innovation Counsel LLP (57) ABSTRACT

One or more embodiments of a backlight assembly include a light guide plate (LGP), a light source module and an optical sheet. The LGP includes a side surface and an upper surface. The light source module includes a power-transmitting member and a plurality of point light sources disposed on the power-transmitting member. A side portion of the power-transmitting member is disposed on a peripheral portion of the upper surface adjacent to the side surface and a light-exiting surface of the point light sources facing the side surface to be adjacent to the side surface. The optical sheet is disposed on the upper surface. A portion of the optical sheet is disposed between a corner portion of the upper surface and the power-transmitting member adjacent to the light-exiting surface. The amount of the light absorbed by a reflective member may be decreased to improve the efficiency of the light.

14 Claims, 8 Drawing Sheets

BACKLIGHT ASSEMBLY AND DISPLAY DEVICE HAVING THE SAME

PRIORITY STATEMENT

This application claims priority under 35 U.S.C. §119 to Korean Patent Application No. 2008-51793, filed on Jun. 2, 2008 in the Korean Intellectual Property Office (KIPO), the contents of which are herein incorporated by reference in their entirety.

BACKGROUND

1. Technical Field

Example embodiments of the present invention relate to a backlight assembly and a display device having the backlight assembly. More particularly, example embodiments of the present invention relate to a backlight assembly having a light guide plate (LGP) to be used for a display device and a display device having the backlight assembly.

2. Description of the Related Art

Generally, a liquid crystal display (LCD) device includes a backlight assembly supplying a display panel with light to display an image in a dark place. Backlight assemblies having light-emitting diodes (LEDs) are widely used for display devices such as mobile LCD devices of mobile communication terminals, digital cameras and computer monitors. A backlight assembly having an LED has various advantageous characteristics such as light weight, thin thickness, etc.

In a direct illumination type display device, the LED of the backlight assembly is disposed under the display panel. In an edge illumination type display device, the LED of the backlight assembly is disposed adjacent to a side of a light guide plate (LGP). A plurality of LEDs of the edge illumination type display device is arrayed on a flexible printed circuit board (FPCB) having lines printed on a flexible resin film.

A light-controlling technology of the edge illumination type backlight assembly has been developed to decrease the leakage of the light emitted from the LED and to guide the light toward an effective display area, thereby improving image display quality. Therefore, the edge illumination type backlight assembly requires a structure to decrease the loss of the light and light leakage.

The FPCB on which the LED is mounted may leak the light. Also, optical sheets may become lifted from the LGP to deteriorate the image display quality of the display device.

SUMMARY

Example embodiments of the present invention provide a backlight assembly capable of decreasing light leakage to improve luminance.

Example embodiments of the present invention also provide a display device having the backlight assembly to improve image display quality.

According to an embodiment the present invention, a backlight assembly includes a light guide plate (LGP), a light source module and an optical sheet. The LGP includes a side surface and an upper surface connected to the side surface. The light source module includes a power-transmitting member and a plurality of point light sources being mounted on the power-transmitting member. A portion of the power-transmitting member is disposed on an edge portion of the upper surface adjacent to the side surface and a light-exiting surface of the point light sources facing the side surface to be adjacent to the side surface. The optical sheet is disposed on the upper surface. An end portion of the optical sheet is disposed between the edge portion of the upper surface and the power-transmitting member to be adjacent to the light-exiting surface.

In an example embodiment of the present invention, the backlight assembly may further include a reflective member disposed on the power-transmitting member except for an area corresponding from the light-exiting surface of the point light source to an edge portion of the power-transmitting member. The end portion of the optical sheet may have an embossing pattern defined by a plurality of recesses on which the reflective members between the point light sources are extended to be disposed and a plurality of protruded portions being defined by the recesses to correspond with the point light sources. Alternatively, the end portion of the optical sheet may have a substantially linear edge extended in a direction of the arrangement of the point light sources.

In an example embodiment of the present invention, an edge portion of the upper surface may be inclined with respect to a lower surface of the LGP. A light-incident surface of the LGP may have a greater thickness than an opposite surface of the LGP. A plurality of light source recesses may be formed through the side surface, on which the point light sources are disposed, respectively, and each of the light sources may be open in a vertical direction of the LGP.

In an example embodiment of the present invention, the optical sheet may include a diffusion sheet, and the end portion of the diffusion sheet may be disposed between the edge portion o the upper surface and the power-transmitting member. The optical sheet may further include a light condensing sheet stacked on the diffusion sheet so that it is not overlapped with the power-transmitting member. The optical sheet may further include another light condensing sheet stacked on the diffusion sheet. An end portion of the light condensing sheet may have a shape corresponding to the end portion of the optical sheet to be disposed between the diffusion sheet and the power-transmitting member.

According to another aspect of the present invention, a backlight assembly includes an LGP, a light source module and a reflective member. The LGP includes a side surface and an upper surface connected to the side surface. The light source module includes a power-transmitting member and a plurality of point light sources being mounted on the power-transmitting member. A portion of the power-transmitting member is disposed on an edge portion of the upper surface adjacent to the side surface and a light-exiting surface of the point light sources facing the side surface to be adjacent to the side surface. The reflective member is disposed on the power-transmitting member between the point light sources except for an area corresponding from the light-exiting surface of the point light source to an edge portion of the power-transmitting member disposed on the upper surface.

In an example embodiment of the present invention, the backlight assembly may further include an optical sheet disposed on the upper surface, wherein an end portion of the optical sheet is disposed between the edge portion of the upper surface and the power-transmitting member so that the optical sheet is adjacent to the light-exiting surface. The reflective member may be extended from an area between the point light sources toward the end portion of the optical sheet, the end portion of the optical sheet corresponding to the point light source being protruded toward the point light source to have an embossing pattern. The end portion of the optical sheet may have a substantially linear edge facing the point light source and the reflective member.

In an example embodiment of the present invention, the edge portion of the upper surface may be inclined with respect to a lower surface of the LGP. A light-incident surface of the LGP may have a greater thickness than an opposite surface of the LGP. A plurality of light source recesses may be formed through the side surface, on which the point light sources are disposed, respectively, and each of the light sources may be open in a vertical direction of the LGP.

In an example embodiment of the present invention, the optical sheet may include a diffusion sheet and a light condensing sheet. The diffusion sheet may include an end portion disposed between the edge side portion of the upper surface and the power-transmitting member. The light condensing sheet may be stacked on the diffusion sheet.

According to still another embodiment of the present invention, a display device includes a display panel, an LGP, a light source module and an optical sheet. The LGP includes an upper surface facing a rear surface of the display panel and a side surface connected to the upper surface. The light source module includes a power-transmitting member and a plurality of point light sources being mounted on the power-transmitting member. A portion of the power-transmitting member is disposed on an edge portion of the upper surface adjacent to the side surface, and a light-exiting surface of the point light sources facing the side surface to be adjacent to the side surface. The optical sheet is disposed on the upper surface. An end portion of the optical sheet is disposed between the edge portion of the upper surface and the power-transmitting member to be adjacent to the light-exiting surface.

In an example embodiment of the present invention, the backlight assembly may further include a reflective member. The reflective member is disposed on the power-transmitting member except for an area corresponding from the light-exiting surface of the point light source to an edge portion of the power-transmitting member disposed on the upper surface.

In an example embodiment of the present invention, the edge portion of the upper surface may be inclined with respect to a lower surface of the LGP. A light-incident surface of the LGP may have greater thickness than an opposite surface of the LGP.

In an example embodiment of the present invention, the optical sheet may include a diffusion sheet and a light condensing sheet. The diffusion sheet includes an end portion disposed between the edge portion of the upper surface and the power-transmitting member. The light condensing sheet is stacked on the diffusion sheet.

In an example embodiment of the present invention, the display device may further include a light-blocking member. The light-blocking member is disposed at a peripheral portion except for a display area of the display panel. The light-blocking member covers the power-transmitting member and a side portion of the light condensing sheet adjacent to the power-transmitting member.

According to further still another embodiment of the present invention, a display device includes a display panel, an LGP, a light source module and an optical reflective member. The LGP includes an upper facing a rear surface of the display panel and a side surface connected to the upper surface. The light source module includes a power-transmitting member and a plurality of point light sources being mounted on the power-transmitting member. A portion of the power-transmitting member is disposed on an edge portion of the upper surface adjacent to the side surface, and a light-exiting surface of the point light sources facing the side surface to be adjacent to the side surface. The reflective member is disposed on the power-transmitting member between the point light sources except for an area corresponding from the light-exiting surface of the point light source to an edge portion of the power-transmitting member disposed on the upper surface.

In an example embodiment of the present invention, the backlight assembly may further include a diffusion sheet and a light condensing sheet. The diffusion sheet includes an end portion disposed between the edge portion of the upper surface and the power-transmitting member. The light condensing sheet is stacked on the diffusion sheet.

In an example embodiment of the present invention, the display device may further include a light-blocking member. The light-blocking member is disposed at a peripheral portion except for a display area of the display panel. The light-blocking member covers the power-transmitting member and a side portion of the light condensing sheet adjacent to the power-transmitting member.

According to one or more example embodiments of the present invention, the amount of the light absorbed by the reflective member may be decreased to improve the efficiency of the light. Also, the optical sheets may be adjacent to the point light source to decrease the leakage of the light emitted from the point light source. Furthermore, the power-transmitting member presses end portions of the optical sheets to prevent the optical sheets from being lifted off. Therefore, the image display quality of the display device may be improved.

BRIEF DESCRIPTION OF THE DRAWINGS

The above and other features and advantages of the embodiments of the present invention will become more apparent by describing in detail example embodiments thereof with reference to the accompanying drawings, in which.

DETAILED DESCRIPTION

Embodiments of the present invention are described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present disclosure. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 1:
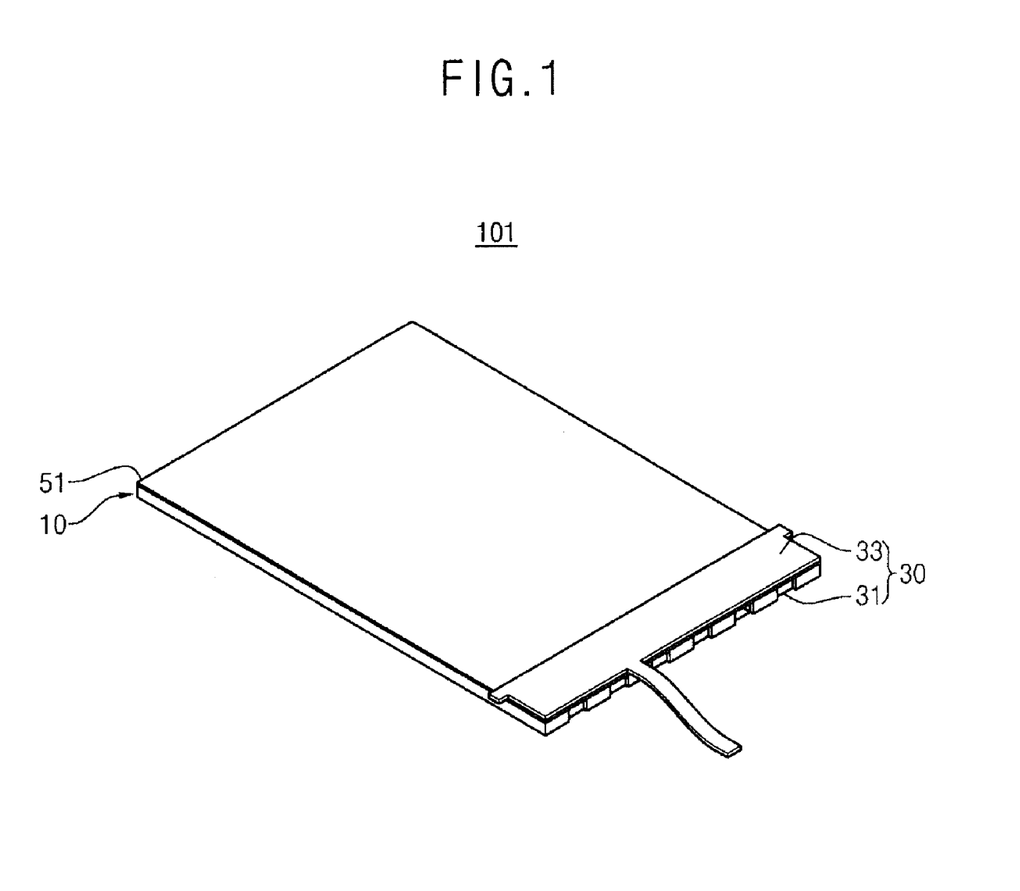
FIG. 1 is a perspective view illustrating a backlight assembly in accordance with one embodiment of the present invention.
Figure 2:
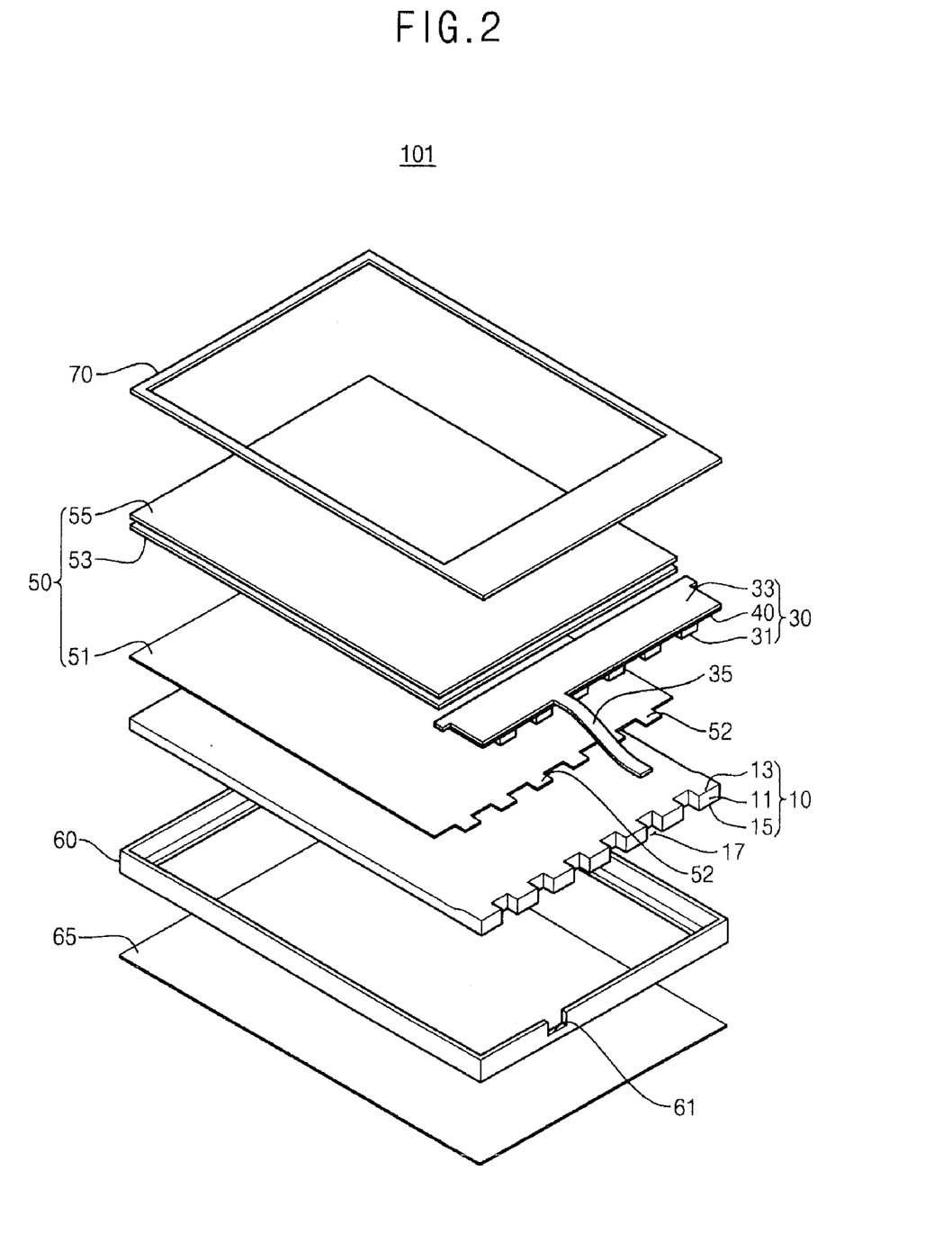
FIG. 2 is an exploded perspective view illustrating the backlight assembly shown in FIG. 1 according to an embodiment.

FIG. 1 is a perspective view illustrating a backlight assembly in accordance with one embodiment of the present invention. FIG. 2 is an exploded perspective view illustrating the backlight assembly shown in FIG. 1 according to an embodiment.

Referring to FIGS. 1 and 2, the backlight assembly 101 includes a light guide plate (LGP) 10, a light source module 30 and optical sheets 50.

The LGP 10 guides light generated from the light source module 30 toward the optical sheets 50. The LGP 10 has a substantially plate shape. Thus, the LGP 10 includes four side surfaces, an upper surface 13 and a lower surface 15.

Two of the side surfaces of the LGP 10 face remaining two of the side surfaces of the LGP 10, respectively. One of the side surfaces is a light-incident surface 11 adjacent to the light source module 30. The LGP 10 may have one light-incident surface 11 or a plurality of light-incident surfaces. For example, the light source module 30 is adjacent to the light-incident surface 11 connected to a side of the upper surface 13.

A portion of the LGP 10 adjacent to the light-incident surface 11 may have a greater thickness than a remaining portion of the LGP 10. In FIG. 2, a side portion of the upper surface 13 adjacent to the light-incident surface 11 is inclined with respect to the lower surface 15 of the LGP 10. Thus, the side portion of the upper surface 13 adjacent to the light-incident surface 11 has a greater thickness than the remaining portion of the LGP 10. Therefore, the light-incident surface 11 has enough area to cover the light source module 30.

The light-incident surface 11 has a plurality of light source recesses 17. Each of the light source recesses 17 is open in a vertical direction of the LGP 10. The upper surface 13 has a rectangular plate shape, and four sides of the upper surface 13 are connected to upper sides of the side surfaces. The lower surface 15 faces the upper surface 13, and has a rectangular shape. Four sides of the lower surface 15 are connected to lower sides of the side surfaces.

Light incident to the LGP 10 through the light source recesses 17 is repetitively reflected between the lower surface 15 and the upper surface 13, and then exits the LGP 10 through the upper surface 13. The light exiting from the LGP 10 has a planar shape.

The LGP 10 includes a polymer resin having various characteristics such as high light transmittance, high heat resistance, high chemical resistance, high mechanical strength, etc. Examples of the high polymer resin that may be used for the LGP 10 may include polymethylmethacrylate, polyamide, polyimide, polypropylene, polyurethane, etc. These may be used alone or in a combination thereof.

Figure 3:
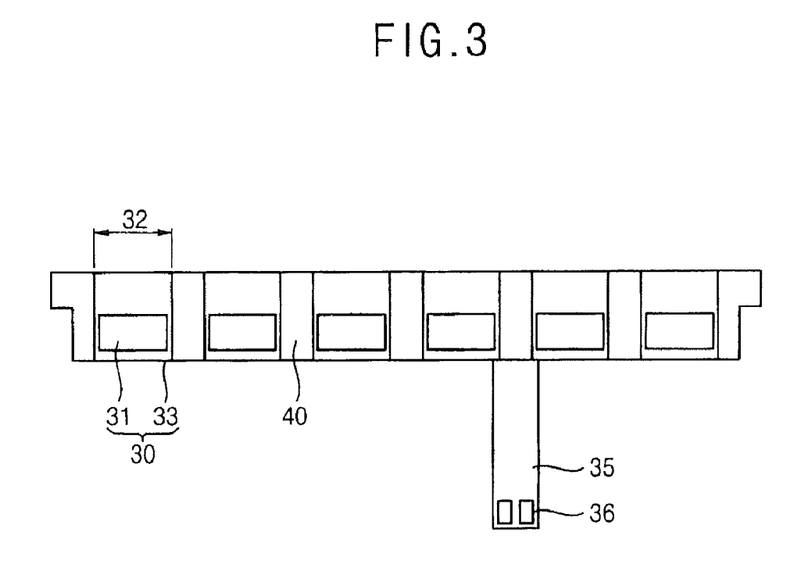
FIG. 3 is a plan view illustrating the light source module shown in FIG. 2 according to an embodiment.

FIG. 3 is a plan view illustrating the light source module shown in FIG. 2 according to an embodiment.

Referring to FIGS. 2 and 3, the light source module 30 includes a power-transmitting member 33 and a plurality of point light sources 31.

A portion of the power-transmitting member 33 is disposed on a peripheral portion of the upper surface 13 of the LGP 10 adjacent to the light-incident surface 11. The power-transmitting member 33 may include a flexible printed circuit board (FPCB) having a band shape. The power-transmitting member 33 may have substantially the same width as the light-incident surface 11. The power-transmitting member 33 includes a base film including a synthetic resin and a power supply line. The base film is electrically insulating and mechanically flexible. The power supply line is formed on the base film.

The point light sources 31 receive a driving power from the power-transmitting member 33 to generate light. The point light sources 31 are mounted on the power-transmitting member 33 that is disposed on the upper surface 13. The point light sources 31 may be linearly aligned on the power-transmitting member 33. A power input terminal and a power output terminal of each of the point light sources 31 are electrically connected to the power supply line.

Each of the point light sources 31 may include a light-emitting diode (LED). The point light sources 31 are received in the light source recesses 17. A light-exiting surface of each of the point light sources 31 faces the light-incident surface 11 and is adjacent to the light-incident surface 11.

A power connection portion 35 is extended from a body of the power-transmitting member 33. The power connection portion 35 may have a plurality of contact terminals 36 for receiving a driving power that is provided from an exterior to the point light sources 31.

A light guide area 32 is defined between the point light sources 31 and a side of the power-transmitting member 33, which is disposed on the upper surface 13, and the light guide area 32 has a greater width than the point light sources 31.

For example, a plurality of light guide areas 32 corresponding to the light-exiting portion of the point light sources 31 is defined on the power-transmitting member 33. A majority of the light exiting from the point light sources 31 is incident into the light-incident surface 11, and a remainder of the light is incident into the optical sheets 50 disposed in the light guide area 32.

The backlight assembly 101 may further include a reflective member 40.

The reflective member 40 reflects a portion of the light, which is not guided toward the effective light-emitting area defined on the upper surface 13, towards the upper surface 13 of the LGP 10. A portion of the light irradiated onto the reflective member 40 may be absorbed by the reflective member 40.

The reflective member 40 is disposed on the power-transmitting member 33 except for the light guide area 32. For example, the reflective member 40 is disposed on the power-transmitting member 33 that is interposed between adjacent point light sources 31, and is extended towards a side of the power-transmitting member 33. The reflective member 40 may be of a tape type to be attached to the power-transmitting member 33.

Alternatively, the reflective member 40 may be extended towards the light guide area 32. However, when the reflective member 40 is extended towards the light guide area 32, the light is reflected adjacent to the light-exiting portion of the point light source 31 so that the reflected light may not be guided toward the LGP 10, thereby increasing the leakage of the light. Also, when the reflective member 40 is disposed in the light guide area 32, onto which the light generated from the point light sources 31 is directly irradiated, the light may be absorbed by the reflective member 40, which would increase the leakage of the light.

In FIGS. 1 to 3, the reflective member 40 is not disposed in the light guide region 32 into which the light generated from the point light sources 31 is incident. Thus, the leakage of the light adjacent to the point light source 31 may be decreased, and the amount of the light absorbed by the reflective member 40 may be decreased, so that the leakage of the light may be greatly decreased.

Figure 4:
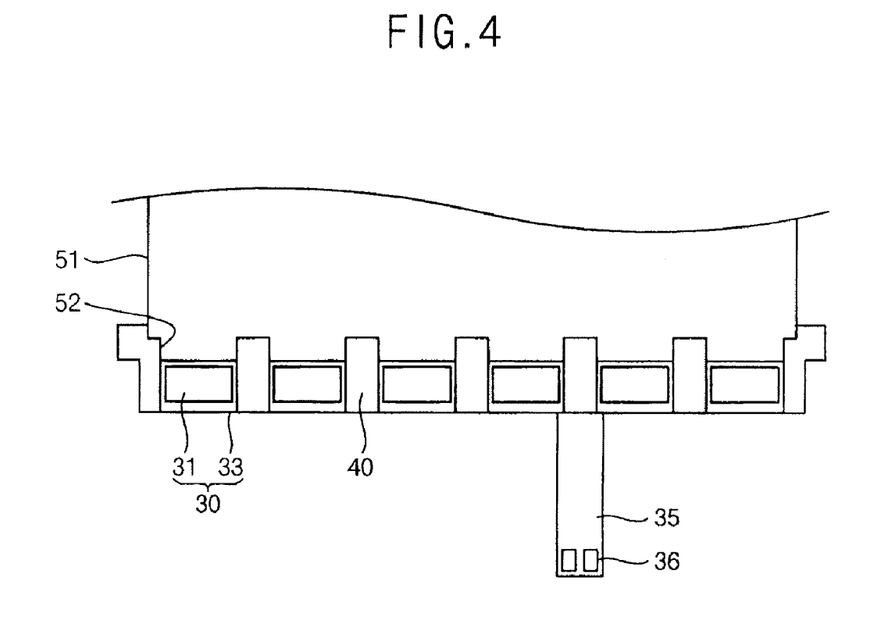
FIG. 4 is a plan view illustrating the light source module and optical sheets shown in FIG. 3 according to an embodiment.

FIG. 4 is a plan view illustrating the light source module and optical sheets shown in FIG. 3 according to an embodiment.

Referring to FIGS. 2 to 4, the optical sheets 50 are disposed on the upper surface 13 of the LGP 10 to improve optical characteristics of the light exiting the upper surface 13. The optical sheets 50 may include a diffusion sheet 51, a first light condensing sheet 53, a second light condensing sheet 55, etc. For example, the light condensing sheet may be a prism sheet. Alternatively, the light condensing sheet may be a brightness enhancement sheet.

The diffusion sheet 51 diffuses the light exiting the upper surface 13 to increase luminance uniformity. A portion of the diffusion sheet 51 adjacent the peripheral portion of the upper surface 13 may be disposed between the upper surface 13 and the power-transmitting member 33 that is disposed on the upper surface 13. For example, the power-transmitting member 33 covers a portion of the diffusion sheet 51 so that the diffusion sheet 51 may not be lifted off from the upper surface 13 of the LGP 10.

A plurality of recesses is formed on a side of the diffusion sheet 51, and corresponds to spaces between adjacent point light sources 31. A plurality of protruded portions 52 may protrude towards the point light sources 31. The protruded portions 52 are disposed in the light guide areas 32, respectively. Thus, an embossing pattern formed by the recesses and the protruded portions 52 is formed on the side portion of the diffusion sheet 51.

The protruded portions 52 guide the light leaked between the upper surface 13 of the LGP 10 and the power-transmitting member 33 towards the effective light-emitting area of the backlight assembly 101. The effective light-emitting area corresponds to a display area of a display panel that is combined with the backlight assembly 101.

The first and second light condensing sheets 53 and 55 improve luminance of the light exiting from the diffusion sheet 51 when viewed on a plane. The first and second light condensing sheets 53 and 55 may be stacked on the diffusion sheet 51, in sequence. The first and second light condensing sheets 53 and 55 may have different prism directions that are substantially perpendicular to each other. For example, the first and second light condensing sheets 53 and 55 may not be overlapped with the power-transmitting member 33.

Examples of a high polymer resin that may be used for the diffusion sheet 51, the first light condensing sheet 53 and the second light condensing sheet 55 may include polymethylmethacrylate, polyamide, polyimide, polypropylene, polyurethane, etc. These may be used alone or in a combination thereof.

The diffusion sheet 51, the first light condensing sheet 53 and the second light condensing sheet 55 may have substantially the same or a greater refractive index than the power-transmitting member 33.

Figure 5:
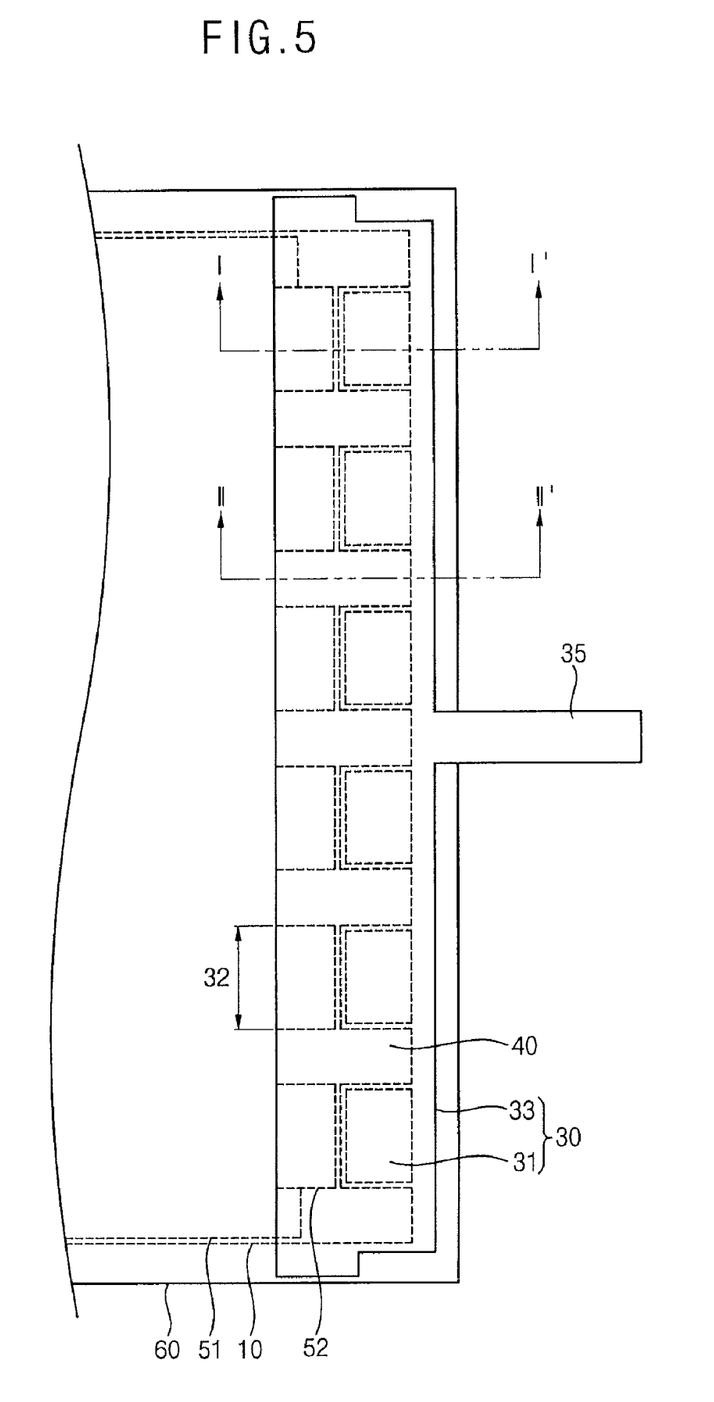
FIG. 5 is a plan view illustrating the backlight assembly shown in FIG. 2 according to an embodiment.
Figure 6A:
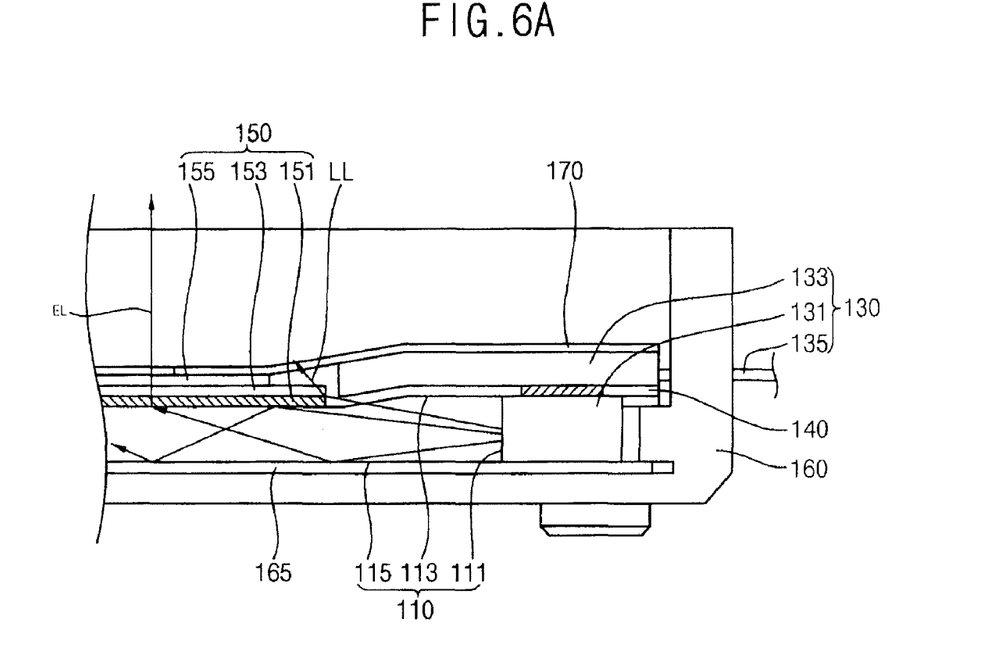
FIG. 6A is a cross-sectional view illustrating the backlight assembly shown in FIG. 5 according to an embodiment when a diffusion sheet is not overlapped with the power-transmitting member.

FIG. 5 is a plan view illustrating the backlight assembly shown in FIG. 2 according to an embodiment. FIG. 6A is a cross-sectional view illustrating the backlight assembly shown in FIG. 5 according to an embodiment when a diffusion sheet is not overlapped with the power-transmitting member.

Referring to FIGS. 5 and 6A, a diffusion sheet 151, a first light condensing sheet 153 and a second light condensing sheet 155 are not overlapped with a power-transmitting member 133. Thus, a gap may be formed between the diffusion sheet 151 and the power-transmitting member 133.

In FIG. 6A, a portion of the LGP 110 adjacent to a light-incident surface 111 of the LGP 110 has a greater thickness than a remaining portion of the LGP 110. That is, the area of the light-incident surface 111 has a greater size than the area of a corresponding surface of the LGP 110. Thus, a gap may be formed between a side of the power-transmitting member 133 and an upper surface 113 of the LGP 110.

Thus, a portion of the light emitted from point light sources 131 may leak through the gap between the power-transmitting member 133 and the upper surface 113 of the LGP 110. The leaked light exits through the gap between the power-transmitting member 133 and the diffusion sheet 151. The leaked light cannot be an exiting light (EL), but becomes a loss light LL.

Figure 6B:
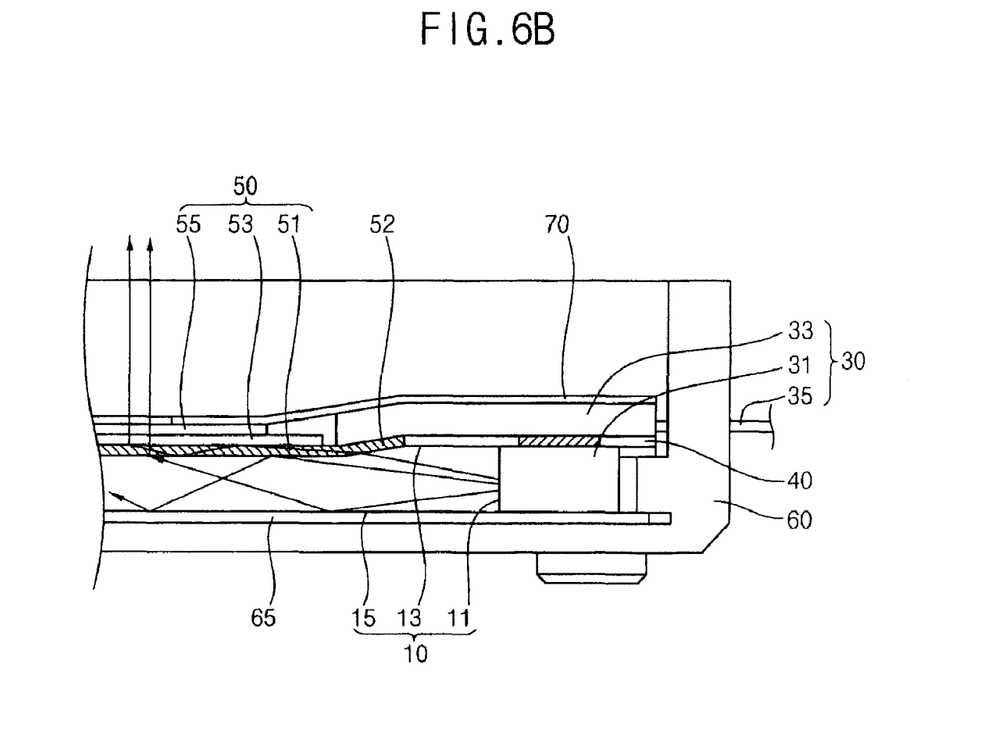
FIG. 6B is a cross-sectional view taken along a line I-I' shown in FIG. 5 according to an embodiment.

FIG. 6B is a cross-sectional view taken along a line I-I' shown in FIG. 5 according to an embodiment.

Referring to FIGS. 2, 5 and 6B, a backlight assembly 101 may further include a receiving container 60 and a reflective sheet 65.

The receiving container 60 receives a LGP 10, a light source module 30 and optical sheets 50. The receiving container 60 may have a rectangular frame shape. Thus, the receiving container 60 covers side surfaces of the LGP 10, and supports a peripheral portion of a lower surface 15 of the LGP 10. For example, the receiving container 60 may be formed by molding a synthetic resin.

The reflective sheet 65 reflects light leaked through the lower surface 15 of the LGP 10 toward the LGP 10. The reflective sheet 65 may be attached to the lower surface 15 of the LGP 10.

As shown in FIG. 5, the power connection portion 35 of the power-transmitting member 33 protrudes through a through-hole 61 of the receiving container 60. Point light sources 31 are received in a light source recess 17 formed at a light-incident surface of the LGP 10, and is surrounded by the receiving container 60, the reflective sheet 65 and the power-transmitting member 33.

The power-transmitting member 33 is disposed on the LGP 10 to cover the light source recess 17. A longitudinal side of the power-transmitting member 33 is disposed on the receiving container 60. Alternatively, the longitudinal side of the power-transmitting member 33 may be attached to the receiving container 60.

A side of the difflusion sheet 51, which has an embossing pattern, may be interposed between the upper surface 13 and the power-transmitting member 33, so that a protruded portion 52 of the embossing pattern is completely covered by the power-transmitting member 33.

The first and second light condensing sheets 53 and 55 are stacked on a remaining portion of the diffusion sheet 51, which is not covered by the power-transmitting member 33.

The backlight assembly 101 may further include a light-blocking member 70. The light-blocking member 70 may cover a peripheral portion of the second light condensing sheet 55 and the power-transmitting member 33. The light-blocking member 70 blocks the light leaked through the power-transmitting member 33. Also, the light-blocking member 70 blocks the light leaked through the power-transmitting member 33 and the side of the first light condensing sheet 53. For example, the reflective member 40 has a tape shape. The light-blocking member 70 may also have a tape shape.

In FIG. 5, the line I-I' crosses the light guide area 32. Referring to FIG. 6B, a majority of the light emitted from the point light source 31 is incident into the light-incident surface 11, and is guided by the LGP 10. A portion of the light is incident into the light guide area 32, and is reflected from an interface between the LGP 10 and the protruded portion 52 to be guided into the LGP 10. A portion of the light transmits the interface between the LGP 10 and the protruded portion 52, and is irradiated onto an interface between the protruded portion 52 and the power-transmitting member 33.

The diffusion sheet 51 may have substantially the same refractive index as the power-transmitting member 33 or have a greater refractive index than the power-transmitting member 33, so that the light may be totally reflected from the interface between the protruded portion 52 and the power-transmitting member 33. Thus, the majority of the light incident into the protruded portion 52 is not leaked toward the power-transmitting member 33, but is guided by the diffusion sheet 51 toward the effective light-emitting area of the backlight assembly 101. Thus, the loss of the light and leakage of the light are decreased.

Figure 7:
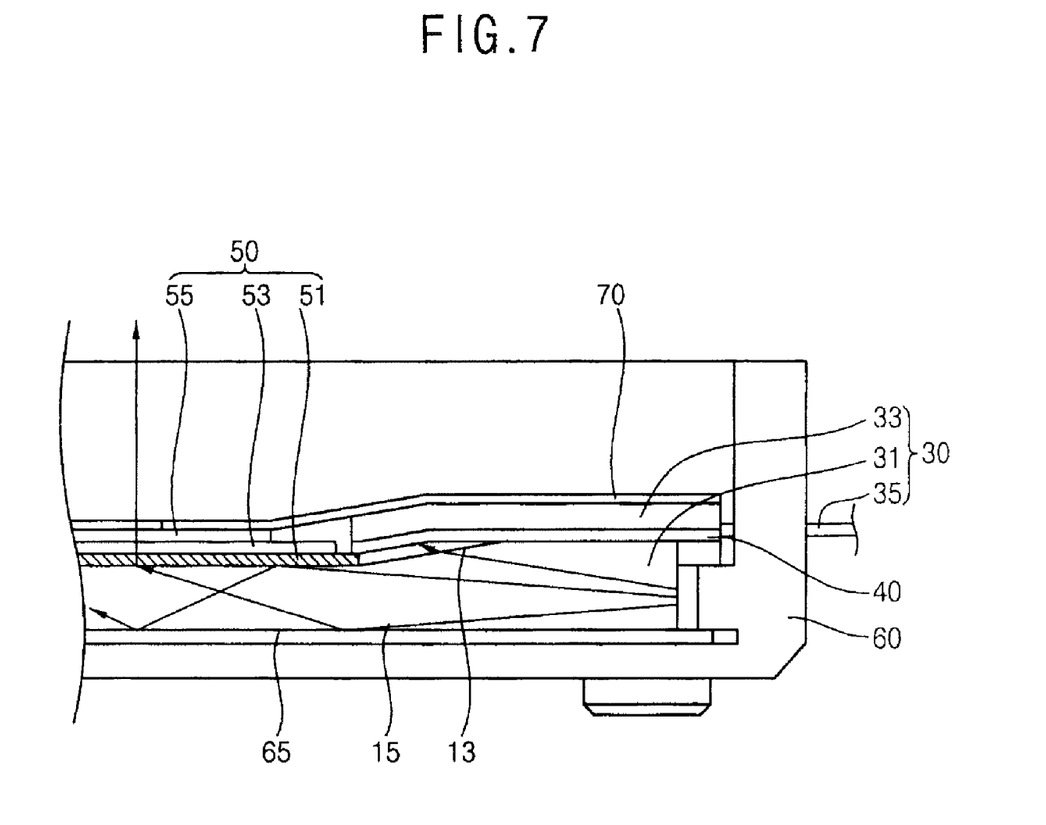
FIG. 7 is a cross-sectional view taken along a line II-II' shown in FIG. 5 according to an embodiment.

FIG. 7 is a cross-sectional view taken along a line II-II' shown in FIG. 5 according to an embodiment.

The line II-II' crosses a reflective member 40 between adjacent point light sources 31 of FIG. 5. Referring to FIG. 7, the reflective member 40 is interposed between the adjacent point light sources 31, and extends toward a side of a power-transmitting member 33. A portion of the light emitted from the point light source 31 is incident into an interface between a LGP 10 and the reflective member 40. A portion of the light irradiated onto the interface between the LGP 10 and the reflective member 40 is reflected from the interface between the LGP 10 and the reflective member 40, and a remainder of the light irradiated onto the interface between the LGP 10 and the reflective member 40 is absorbed by the reflective member 40. Thus, the leakage of the light between the adjacent light sources 31 may be decreased.

According to the backlight assembly 101 of the present embodiment, the reflective member 40 is partially removed in the light guide area 32 in a light-exiting direction of the point light sources 31 to prevent the leakage of the light caused by the light reflection from the reflective member 40. Thus, the amount of the light absorbed by the reflective member 40 may be decreased, so that the loss of the light may be decreased.

Also, the protruded portion 52 is disposed on the end portion of the optical sheet 50 in the light guide area 32 to guide the leaked light toward the effective light-emitting area, thereby improving the efficiency of the light.

Furthermore, a portion of the optical sheets 50 may be completely covered by the power-transmitting member 33 to prevent the optical sheets 50 from being lifted off from the upper surface 13 of the LGP 10.

Therefore, the light efficiency of the backlight assembly 101 may be improved.

Figure 8:
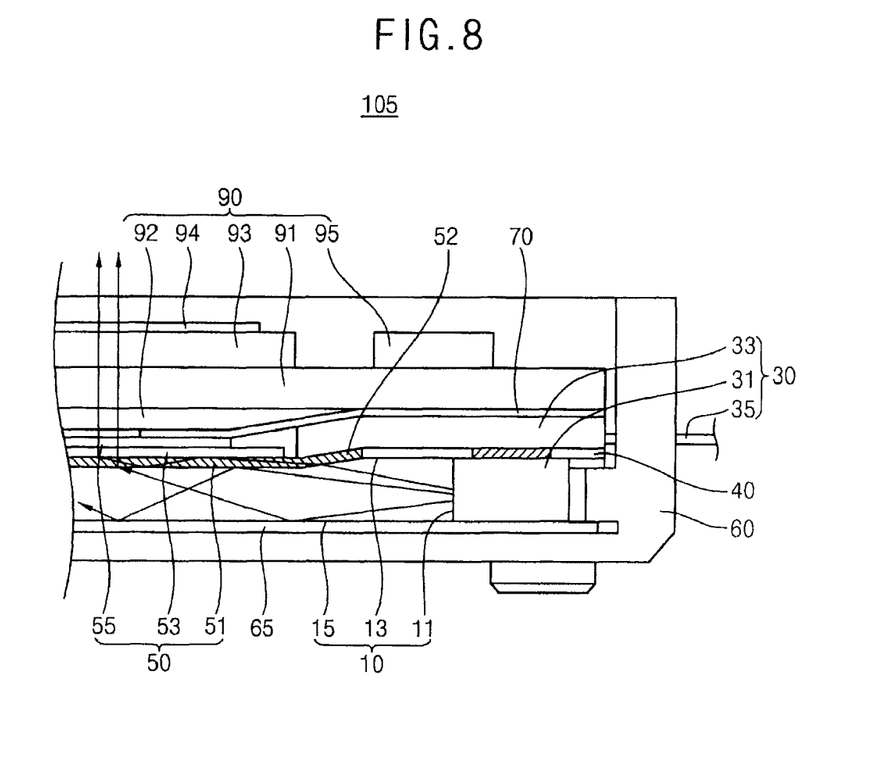
FIG. 8 is a cross-sectional view illustrating the backlight assembly shown in FIG. 6B according to an embodiment.

FIG. 8 is a cross-sectional view illustrating the backlight assembly shown in FIG. 6B according to an embodiment.

Referring to FIG. 8, a display device includes the backlight assembly 101 and a display panel 90 according to an embodiment.

The backlight assembly 101 according to the embodiment of FIG. 8 is substantially the same as that of the embodiments of FIGS. 1 to 7. Thus, any further repetitive explanations concerning the above elements will be omitted.

The display panel 90 includes a lower substrate 91, an upper substrate 93, a liquid crystal layer, a lower polarizer 92, an upper polarizer 94 and a driving part 95.

A plurality of pixels is formed on the lower substrate 91. The pixels may be an active matrix type. A light-blocking member 70 is disposed in a peripheral portion of the lower substrate 91 except for a display area. Light-exiting from a second light condensing sheet 55 is incident into the lower substrate 91 corresponding to the display area through a lower surface of the lower substrate 91.

The upper substrate 93 is disposed on the lower substrate 91, and has a smaller size than the lower substrate 91. A plurality of color filters may be formed on the upper substrate 93.

The liquid crystal layer is interposed between the lower substrate 91 and the upper substrate 93. That is, the display panel 90 may be a liquid crystal display (LCD) panel 90 that uses liquid crystals as light-controlling elements.

The lower polarizer 92 is disposed on the lower surface of the lower substrate 91, and firstly polarizes the light emitted from the second light condensing sheet 55 toward the liquid crystal layer.

The upper polarizer 94 secondly polarizes the light-exiting from the liquid crystal layer.

The driving part 95 drives the pixels to control light transmittance of the liquid crystal layer. The driving part 95 may be an integrated circuit (IC), and may be disposed on the peripheral portion of the lower substrate 91, which is not covered by the upper substrate 93.

The thickness of the receiving container 60 may be substantially the same as the thickness of the backlight assembly 101 plus the thickness of the display panel 90.

The display device 105 may further include a front cover and a rear cover.

The rear cover may be combined with a lower portion of the receiving container 60. The front cover is combined with an upper portion of the receiving container 60, and covers a peripheral portion of the upper substrate 93 having the display area.

Figure 9:
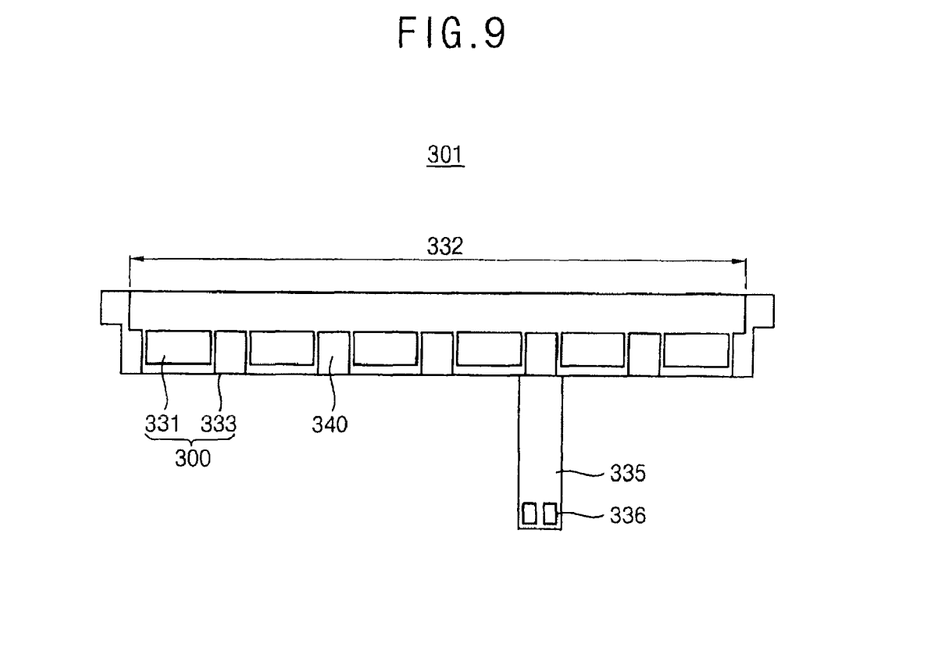
FIG. 9 is a plan view illustrating a light source module for a backlight assembly in accordance with another embodiment of the present invention.

FIG. 9 is a plan view illustrating a light source module for a backlight assembly in accordance with another embodiment of the present invention.

Figure 10:
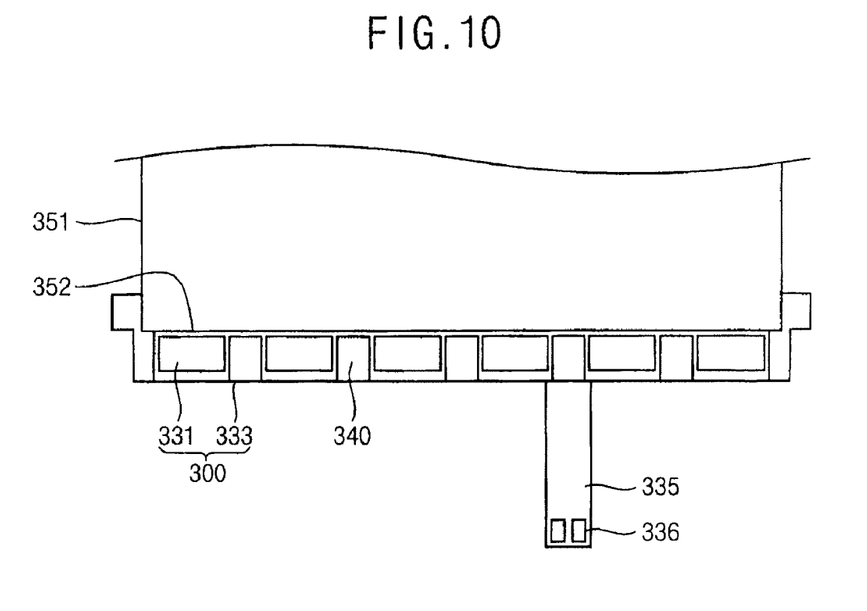
FIG. 10 is a plan view illustrating the light source module of FIG. 9 combined with a diffusion sheet according to an embodiment.

Referring to FIG. 9, the backlight assembly of the embodiment of FIG. 9 is substantially the same as the backlight assembly shown in the embodiments of FIGS. 1 to 7 except for an arrangement of a reflective member 340 and an arrangement of an end portion 352 of a difflusion sheet 351 (also shown in FIG. 10). Thus, any further repetitive explanations will be omitted.

A light guide area 332 has a constant width from a side of the power-transmitting member 333 on an upper surface of the LGP, and has a band shape extended in a longitudinal direction of the power-transmitting member 333. The reflective member 340 is disposed on the power-transmitting member 333 except for the point light sources 331 and the light guide area 332.

FIG. 10 is a plan view illustrating the light source module of FIG. 9 combined with a diffusion sheet according to an embodiment.

Referring to FIGS. 9 and 10, a side 352 of a diffusion sheet 351 is disposed in a light guide area 332, and is overlapped with a power-transmitting member 333. The side 352 of the diffusion sheet 351 has substantially the same shape as a profile of the light guide area 332. Thus, the side 352 of the diffusion sheet 351 does not have the embossed pattern, but has a substantially linear edge.

According to the backlight assembly of the present embodiment, the light guide area 332 and the side 352 of the diffusion sheet 351 have a simpler shape than the backlight of the embodiments of FIGS. 1 to 7, so that a manufacturing process of the backlight assembly may be simplified.

The display device of the embodiment of FIGS. 9 and 10 is substantially the same as the display device of the embodiment of FIG. 8 except for the backlight assembly. Thus, any further repetitive explanation will be omitted.

Figure 11:
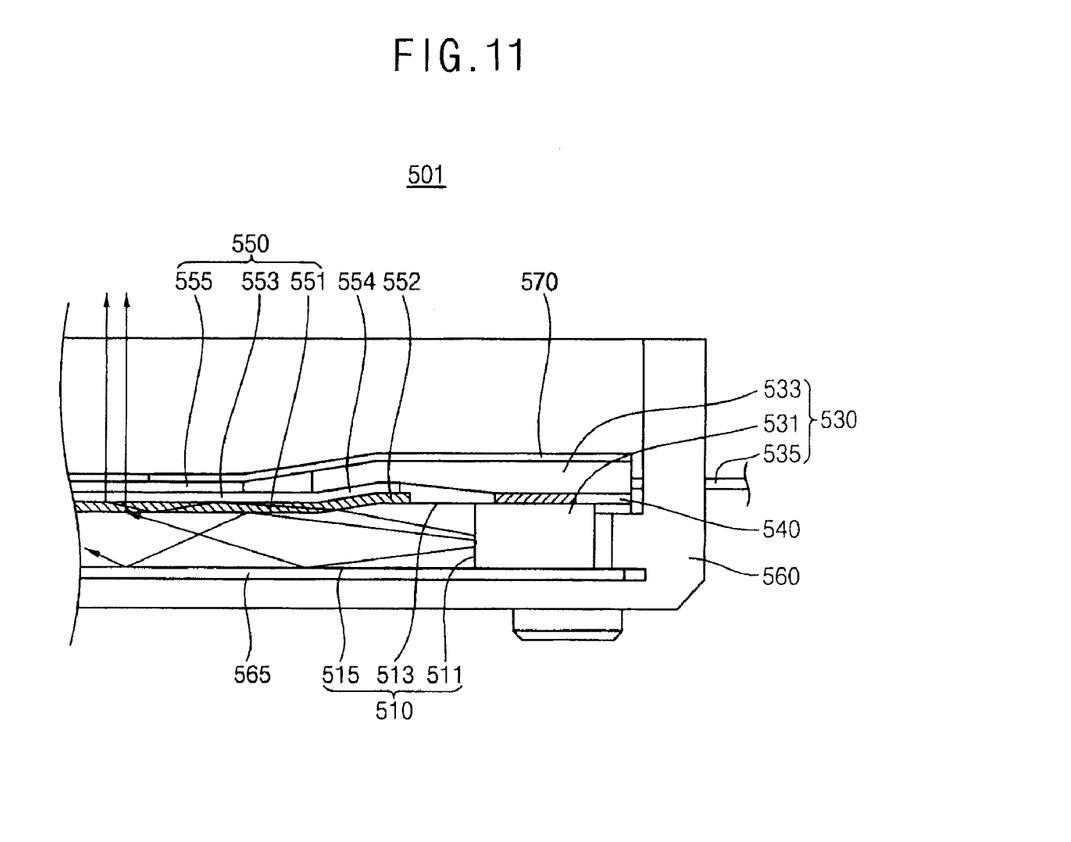
FIG. 11 is a cross-sectional view illustrating a backlight assembly shown in FIG. 3 according to an embodiment.

FIG. 11 is a cross-sectional view illustrating a backlight assembly shown in FIG. 3 according to an embodiment.

Referring to FIG. 11, the backlight assembly 501 of FIG. 11 is substantially the same as the backlight assembly of the embodiments of FIGS. 1 to 7 except for a first light condensing sheet 553. Thus, any further repetitive explanation will be omitted.

The first light condensing sheet 553 is disposed on a diffusion sheet 551, and a side 554 of the first light condensing sheet 553 has an embossed shape corresponding to an embossed side of the diffusion sheet 551. The side 554 of the first light condensing sheet 553 is interposed between the side of the diffusion sheet 551 and a power-transmitting member 533.

Thus, the power-transmitting member 533 prevents first light condensing sheet 553 from being lifted towards the diffusion sheet 551.

Also, the side 554 of the first light condensing sheet 553 guides leaked light, which is incident into a protruded portion 552 formed on the side of the diffusion sheet 551 and has not been guided by the diffusion sheet 551, toward an effective light-emitting area. Thus, the efficiency of the light may be improved, and the leakage of the light may be decreased.

The display device of the embodiment of FIG. 11 is substantially the same as the display device of the embodiment of FIG. 8 except for the backlight assembly 501. Thus, any further repetitive explanation will be omitted.

According to one or more example embodiments of the present invention, loss of light emitted from a point light source adjacent to a side surface of an LGP may be greatly decreased. Also, leaked light may be decreased, and uncontrolled light may be prevented from being incident into a display area.

Therefore, the efficiency of the light of a display device such as a notebook computer or a mobile communication terminal may be improved, thereby improving image display quality.

The foregoing embodiments are illustrative of the present invention and are not to be construed as limiting thereof. Although a few example embodiments of the present invention have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A backlight assembly comprising:
a light guide plate (LGP) comprising a side surface and an upper surface connected to the side surface;
a light source module comprising a power-transmitting member and a plurality of point light sources being mounted on the power-transmitting member, a portion of the power-transmitting member being disposed on an edge portion of the upper surface adjacent to the side surface, and a light-exiting surface of the point light sources facing the side surface to be adjacent to the side surface;
an optical sheet being disposed on the upper surface, an end portion of the optical sheet being disposed between the edge portion of the upper surface and the power-transmitting member to be adjacent to the light-exiting surface, and
reflective members disposed on the power-transmitting member;
wherein the point light sources each have a first surface that is a light emitting surface, a second surface opposite to the first surface, and side surfaces extending between the first and second surfaces;
wherein areas between adjacent ones of the point light sources are defined by imaginary lines extending between first surfaces of the adjacent ones of the point light sources, by imaginary lines extending between second surfaces of the adjacent ones of the point light sources, and by side surfaces of the adjacent ones of the point light sources; and
wherein the reflective members are disposed in the areas between adjacent ones of the point light sources, and
the end portion of the optical sheet has an embossing pattern defined by a plurality of recesses and a plurality of protrusions, the reflective members are extended to be disposed within the recesses, the protrusions correspond with the point light sources, and the protrusions make contact with the power-transmitting member and the upper surface of the LGP.

2. The backlight assembly of claim 1, wherein the edge portion of the upper surface is inclined with respect to a lower surface of the LGP, and a light-incident surface of the LGP has a greater thickness than an opposite surface of the LGP.

3. The backlight assembly of claim 2, wherein a plurality of light source recesses is formed through the side surface, in which the point light sources are disposed, respectively, and each of the light source recesses is open in a vertical direction of the LGP.

4. The backlight assembly of claim 1, wherein the optical sheet comprises a diffusion sheet, and an end portion of the diffusion sheet is disposed between the edge portion of the upper surface and the power-transmitting member.

5. The backlight assembly of claim 4, wherein the optical sheet further comprises a light condensing sheet stacked on the diffusion sheet so that it is not overlapped with the power-transmitting member.

6. The backlight assembly of claim 4, wherein the optical sheet further comprises a light condensing sheet stacked on the diffusion sheet, and an end portion of the light condensing sheet having a shape corresponding to the end portion of the diffusion sheet to be disposed between the diffusion sheet and the power-transmitting member.

7. A backlight assembly comprising:
a light guide plate (LGP) comprising a side surface and an upper surface connected to the side surface;
a light source module comprising a power-transmitting member and a plurality of point light sources being mounted on the power-transmitting member, a portion of the power-transmitting member being disposed on an edge portion of the upper surface adjacent to the side surface, and a light-exiting surface of the point light sources facing the side surface to be adjacent to the side surface;
an optical sheet being disposed on the upper surface, an end portion of the optical sheet being disposed between the edge portion of the upper surface and the power-transmitting member to be adjacent to the light-exiting surface; and
a reflective member disposed on the power-transmitting member except for an area from the light-exiting surface of adjacent the point light sources to an edge portion of the power-transmitting member disposed on the edge portion of the upper surface;
wherein the point light sources each have a first surface that is a light emitting surface, a second surface opposite to the first surface, and side surfaces extending between the first and second surfaces;
wherein areas between adjacent ones of the point light sources are defined by imaginary lines extending between first surfaces of the adjacent ones of the point light sources, by imaginary lines extending between second surfaces of the adjacent ones of the point light sources, and by side surfaces of the adjacent ones of the point light sources; and
wherein the reflective member is disposed in an area between adjacent ones of the point light sources, and
the end portion of the optical sheet has an embossing pattern defined by a plurality of recesses and a plurality of protrusions, the reflective members are extended to be disposed within the recesses, the protrusions correspond with the point light sources, and the protrusions make contact with the power-transmitting member and the upper surface of the LGP.

8. The backlight assembly of claim 7, wherein the edge portion of the upper surface is inclined with respect to a lower surface of the LGP, and a light-incident surface of the LGP has a greater thickness than an opposite surface of the LGP.

9. The backlight assembly of claim 8, wherein a plurality of light source recesses is formed through the side surface, in which the point light sources are disposed, respectively, and each of the light source recesses is open in a vertical direction of the LGP.

10. The backlight assembly of claim 7, wherein the optical sheet comprises:
a diffusion sheet comprising an end portion disposed between the edge portion of the upper surface and the power-transmitting member; and
a light condensing sheet being stacked on the diffusion sheet.

11. A display device comprising:
a display panel;

a light guide plate (LGP) comprising an upper surface facing a rear surface of the display panel and a side surface connected to the upper surface;

a light source module comprising a power-transmitting member and a plurality of point light sources being mounted on the power-transmitting member, a portion of the power-transmitting member being disposed on an edge portion of the upper surface adjacent to the side surface, and a light-exiting surface of the point light sources facing the side surface to be adjacent to the side surface, an optical sheet being disposed on the upper surface, an end portion of the optical sheet being disposed between the edge portion of the upper surface and the power-transmitting member to be adjacent to the light-exiting surface, and reflective members disposed on the power-transmitting member;

wherein the point light sources each have a first surface that is a light emitting surface, a second surface opposite to the first surface, and side surfaces extending between the first and second surfaces;

wherein areas between adjacent ones of the point light sources are defined by imaginary lines extending between first surfaces of the adjacent ones of the point light sources, by imaginary lines extending between second surfaces of the adjacent ones of the point light sources, and by side surfaces of the adjacent ones of the point light sources; and wherein the reflective members are disposed in the areas between adjacent ones of the point light sources, and the end portion of the optical sheet has an embossing pattern defined by a plurality of recesses and a plurality of protrusions, the reflective members are extended to be disposed within the recesses, the protrusions correspond with the point light sources, and the protrusions make contact with the power-transmitting member and the upper surface of the LGP.

12. The display device of claim 11, wherein the edge portion of the upper surface is inclined with respect to a lower surface of the LGP, and a light-incident surface of the LGP has a greater thickness than an opposite surface of the LGP.

13. The display device of claim 11, wherein the optical sheet comprises:

a diffusion sheet comprising an end portion disposed between the edge portion of the upper surface and the power-transmitting member; and a light condensing sheet being stacked on the diffusion sheet.

14. The display device of claim 13, further comprising a light-blocking member being disposed at a peripheral portion except for a display area of the display panel, the light-blocking member covering the power-transmitting member and edge portions of the light condensing sheet adjacent to the power-transmitting member.

* * * * *